(12) United States Patent
Menicucci et al.

(10) Patent No.: US 6,960,017 B1
(45) Date of Patent: Nov. 1, 2005

(54) NON-INVASIVE ENERGY METER FOR FIXED AND VARIABLE FLOW SYSTEMS

(75) Inventors: David F. Menicucci, Albuquerque, NM (US); Billy D. Black, Tijeras, NM (US)

(73) Assignee: Sandia Corporation, Albuquerque, NM (US)

(*) Notice: Subject to any disclaimer, the term of this patent is extended or adjusted under 35 U.S.C. 154(b) by 0 days.

(21) Appl. No.: 10/345,590

(22) Filed: Jan. 15, 2003

Related U.S. Application Data

(60) Provisional application No. 60/351,437, filed on Jan. 24, 2002.

(51) Int. Cl.$^7$ ............................................ G01K 17/06
(52) U.S. Cl. ............................. 374/39; 374/40; 374/41
(58) Field of Search .............................. 374/40, 39, 32, 374/41, 31, 147

(56) References Cited

U.S. PATENT DOCUMENTS

| | | | | |
|---|---|---|---|---|
| 3,593,578 A | * | 7/1971 | Farrell et al. | 374/40 |
| 4,085,613 A | * | 4/1978 | Richard | 374/39 |
| 4,293,916 A | * | 10/1981 | Del Re et al. | 703/6 |
| 4,306,293 A | * | 12/1981 | Marathe | 374/40 |
| 4,332,164 A | * | 6/1982 | Schlesinger et al. | 374/41 |
| 4,363,441 A | * | 12/1982 | Feinberg | 236/36 |
| 4,448,545 A | * | 5/1984 | Pelka et al. | 374/41 |
| 4,455,095 A | * | 6/1984 | Bleiker | 374/39 |
| 4,473,307 A | * | 9/1984 | Dobronyi et al. | 374/39 |
| 4,482,006 A | * | 11/1984 | Anderson | 374/41 |
| 4,485,449 A | * | 11/1984 | Knauss | 702/46 |
| 4,509,679 A | * | 4/1985 | Longini | 236/94 |
| 4,538,925 A | * | 9/1985 | Zgonik | 374/39 |
| 4,577,977 A | * | 3/1986 | Pejsa | 374/39 |
| 4,773,023 A | * | 9/1988 | Giardina | 702/45 |
| 4,779,458 A | * | 10/1988 | Mawardi | 374/41 |
| 5,026,171 A | * | 6/1991 | Feller | 374/41 |
| 5,083,438 A | * | 1/1992 | McMullin | 62/129 |
| 5,125,753 A | * | 6/1992 | Ries et al. | 374/41 |
| 5,156,459 A | * | 10/1992 | Baker et al. | 374/32 |
| 5,924,486 A | * | 7/1999 | Ehlers et al. | 165/238 |
| 6,718,779 B1 | * | 4/2004 | Henry | 62/183 |
| 2002/0018545 A1 | * | 2/2002 | Crichlow | 379/106.03 |
| 2004/0055393 A1 | * | 3/2004 | Vun Cannon | 73/861.18 |

FOREIGN PATENT DOCUMENTS

| | | | | |
|---|---|---|---|---|
| DE | 3343997 C1 | * | 6/1985 | G01K 17/08 |
| EP | 616201 A1 | * | 9/1994 | G01K 17/06 |
| JP | 01296128 A | * | 11/1989 | G01K 17/08 |

* cited by examiner

OTHER PUBLICATIONS

Gleman, S.M., et al., "An Inexpensive Non-Invasive Flow Meter for Solar Applications," *Proceedings of the Annual Meeting of American Section of International Solar Energy Society*, pp 747-749 (1981).

*Primary Examiner*—Gail Verbitsky
*Assistant Examiner*—Mirellys Jagan
(74) *Attorney, Agent, or Firm*—Robert D. Watson; Jeffrey D. Myers

(57) ABSTRACT

An energy metering method and apparatus for liquid flow systems comprising first and second segments of one or more conduits through which a liquid flows, comprising: attaching a first temperature sensor for connection to an outside of the first conduit segment; attaching a second temperature sensor for connection to an outside of the second conduit segment; via a programmable control unit, receiving data from the sensors and calculating energy data therefrom; and communicating energy data from the meter; whereby the method and apparatus operate without need to temporarily disconnect or alter the first or second conduit segments. The invention operates with both variable and fixed flow systems, and is especially useful for both active and passive solar energy systems.

17 Claims, 3 Drawing Sheets

NON-INVASIVE ENERGY METER FOR FIXED AND VARIABLE FLOW SYSTEMS

CROSS-REFERENCE TO RELATED APPLICATIONS

This application claims the benefit of the filing of U.S. Provisional Patent Application Ser. No. 60/351,437, entitled "Non-Invasive, Low Cost Energy Meter for Fixed and Variable Flow Solar Systems", filed on Jan. 24, 2002, and the specification thereof is incorporated herein by reference.

GOVERNMENT RIGHTS

The Government has rights to this invention pursuant to Contract No. DE-AC04-94AL85000 awarded by the U.S. Department of Energy.

BACKGROUND OF THE INVENTION

1. Field of the Invention (Technical Field):
The present invention relates to energy metering of conduits through which a fluid flows.

2. Background Art
Currently energy meters for liquid flow systems (e.g., solar systems) must be installed into the system to measure how much energy the system is producing or losing. This involves cutting pipes, installing thermal wells and flow meters, and/or connecting sensors to pump motors in the system. This often requires a licensed contractor or other authorized individual to complete the task. Many solar systems, for example, are too small and the value of the energy they collect is not sufficient to justify a commercially available BTU meter, which are relatively expensive.

The present invention is of an energy monitoring (metering) device that monitors energy from such systems using a simple technique that senses when the system is running and then estimates the BTU energy production. The metering system can be installed on a system without cutting any pipes or connecting to any electrical systems. The invention is, therefore, completely portable and can be installed without disturbing the system or engaging a contractor or other authorized personnel. The metering system of the invention is useful for both fixed and variable flow systems.

A device for measuring flows as opposed to energy is disclosed in S. M. Gleman, et al., "An Inexpensive Non-Invasive Flow Meter for Solar Applications," Proceedings of the Annual Meeting of the American Section of the International Solar Energy Society, pp. 747–749 (1981). A technique to measure water flow in a pipe without invading the pipe is described wherein one puts so much heat into the pipe upstream and then measure the heat downstream. By knowing how much heat is put in, the size of the pipe (i.e., its mass), and the heat capacity of water, and the measured heat downstream, one can estimate the amount of water that is flowing.

SUMMARY OF THE INVENTION (DISCLOSURE OF THE INVENTION)

The present invention is of an energy metering method and apparatus for liquid flow systems comprising first and second segments of one or more conduits through which a liquid flows, the invention comprising: attaching a first temperature sensor for connection to an outside of the first conduit segment; attaching a second temperature sensor for connection to an outside of the second conduit segment; via a programmable control unit, receiving data from the sensors and calculating energy data therefrom; and communicating energy data from the meter; whereby the invention operates without need to temporarily disconnect or alter the first or second conduit segments. In the preferred embodiment, the temperature sensors comprise digital thermometers, a power source with one or more rechargeable batteries is employed, and communicating occurs at least in part by display and in part by digital input/output port. One embodiment (preferred for variable flow systems) employs a motor sensor to determine when to begin the receiving step. The motor sensor preferably comprises an induction sensor and the programmable control unit calculates energy data in collector performance minutes. In another embodiment (preferred for fixed flow systems), the programmable control unit calculates energy data in British thermal units. The invention is especially useful for systems in which the first and second conduit segments comprise an inlet to and an outlet of a solar energy system.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DESCRIPTION OF THE PREFERRED EMBODIMENTS (BEST MODES FOR CARRYING OUT THE INVENTION)

The present invention is of a monitoring device and method that monitors energy production or loss in liquid systems. An embodiment for fixed flow systems senses when the system is running and then estimates the BTU energy production or loss. An induction sensor is preferably used to detect when a system pump is working and when the system is producing energy. An embodiment for variable flow systems is also provided, as is an embodiment permitting either fixed or variable flow operation. The metering system can be installed without cutting any pipes or connecting to any electrical systems. The device and method is, therefore, completely portable and can be installed without disturbing the liquid system. The discussion below focuses on use of the invention with fixed and variable flow solar thermal systems, but the invention is useful with any liquid system for which energy production or loss needs to be measured.

Currently the energy production from solar systems, especially variable flow solar systems such as integral collectors, is difficult to monitor without a commercially available BTU meter. The installation of such a BTU meter involves cutting pipes and installing thermal wells and flow meters. Many solar systems are too small and the value of the energy they collect is not sufficient to justify a commercially available BTU meter, which are relatively expensive. Moreover, in most cases precise measures of energy production from the system are not needed. Rather, an estimate of the energy production and an indication as to whether the system has been operational is usually sufficient for the interest of the owners of these systems.

Figure 1:
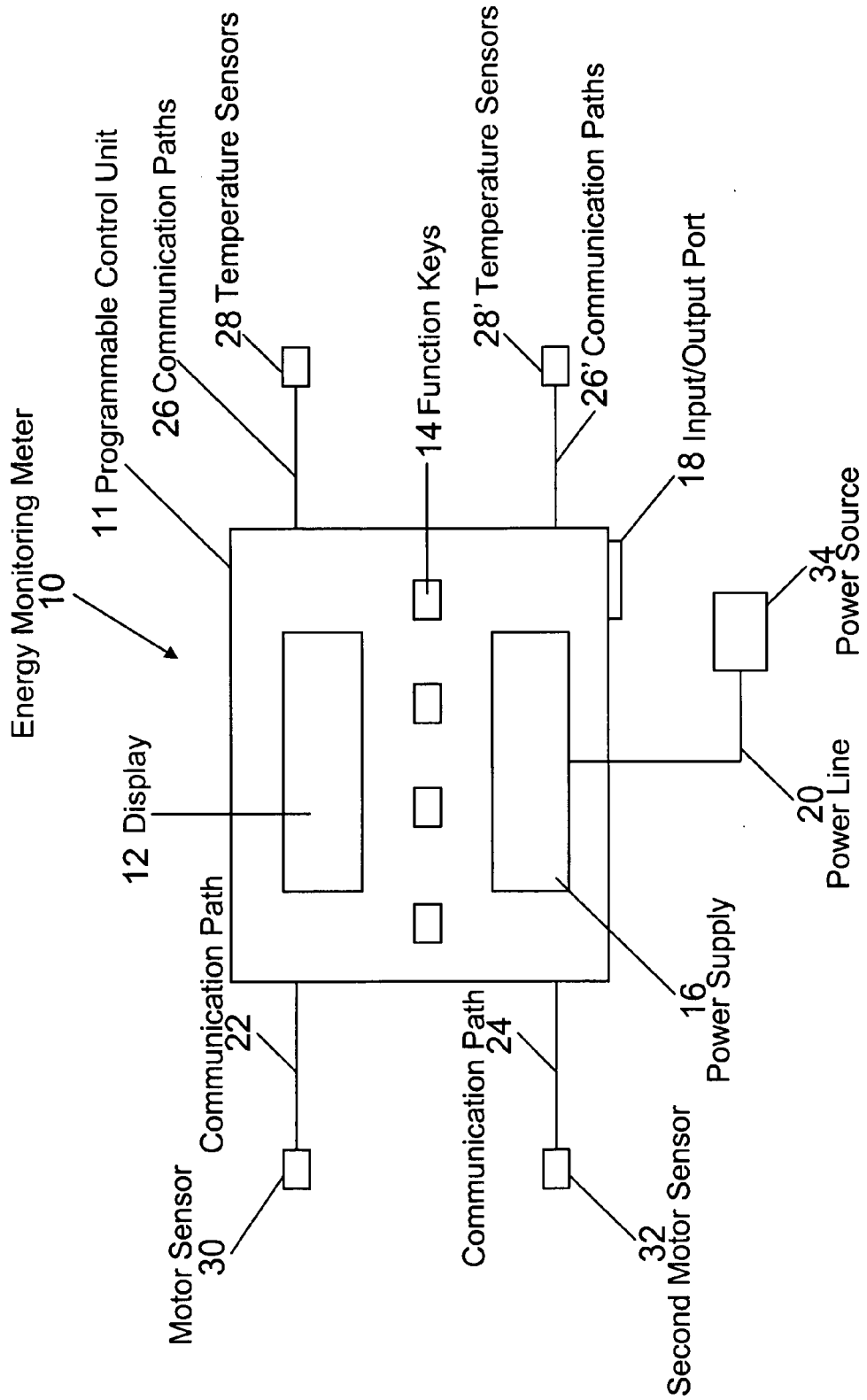
FIG. 1 is a functional block diagram of an embodiment of the invention for when liquid flow is fixed.

FIG. 1 illustrates the preferred energy monitoring meter 10 of the invention that is used for fixed flow systems, which can be installed for example on fixed flow solar systems without the need of cutting pipes or making electrical connections. The meter comprises a programmable control unit 11 comprising printed circuit boards with microprocessor, a programmable logic array, or other like control technology. The meter further comprises display 12 (e.g., an liquid crystal diode (LCD) display), function keys 14 (e.g., up, down, right, left, select, mode, change, enter, on and/or off), and input/output port 18 (e.g., RS232 serial port, universal system bus (USB) port, or the like) for meter programming, configuration, and report output. Power is preferably supplied by power supply 16 (preferably one or more rechargable batteries) connected via power line 20 to power source 34 (preferably a 120 volt alternating current (AC) outlet). The preferred arrangement of rechargable batteries and 120 volt AC supply permits the meter to run either standalone or under external power.

The meter is programmed with the approximate rate of flow of the working fluid within the solar system, or this is input on startup of the meter via the function keys. Temperature sensors 28,28' from the meter are physically placed on the pipes that lead to the inlet and outlet of the solar system, which are connected to the meter via communication paths 26,26' (preferably conductive wire). The preferred sensors are digital thermometers that produce a digital bit series that represents the temperature.

A motor sensor 30, preferably comprising an induction sensor, is placed on or near the motor that operates the working fluid pump in the solar system and communicates with the meter via communication path 22. In addition or alternatively, a second motor sensor 32 (sending pump on by other known means) and communication path 24 may be employed. The induction sensor senses the inductive field that electric motors create while running.

On startup, the meter's energy count is zeroed. When the pump motor is energized and is operational, the motor sensor indicates this condition to the meter and the meter begins to compute the energy production from the system by estimating the amount of fluid flow in the system, computing the difference between the inlet and outlet temperatures, and then estimating energy production, preferably in BTUs. The BTU energy production is then accumulated and can be displayed as required by the user. Fluid flow characteristics are preprogrammed or input into the meter to account for various types of working fluid that could be in the solar system including, but not limited to, water, water/glycol, water/alcohol, oil, etc. If the inlet temperature to the solar system is equal to the outlet temperature, zero BTUs are accumulated regardless whether the pump is running. If the inlet temperature of the solar system is greater than the outlet temperature while the pump is running, either zero BTUs or negative BTUs are computed and added to the total depending on the user's desire.

As an example, suppose that one has a delta T of 10 degrees F. and 30 gallons per minute flowing through the conduits. Water weighs about 8.3 pounds per gallon, and so one has about 8.3*30=249 pounds of water flowing every minute. A BTU is the amount of energy needed to heat one pound of water one degree F. Therefore, one has about 249*10=2490 BTU per minute being generated or 2490*60 min/hour=149,400 BTU per hour being generated.

Figure 2:
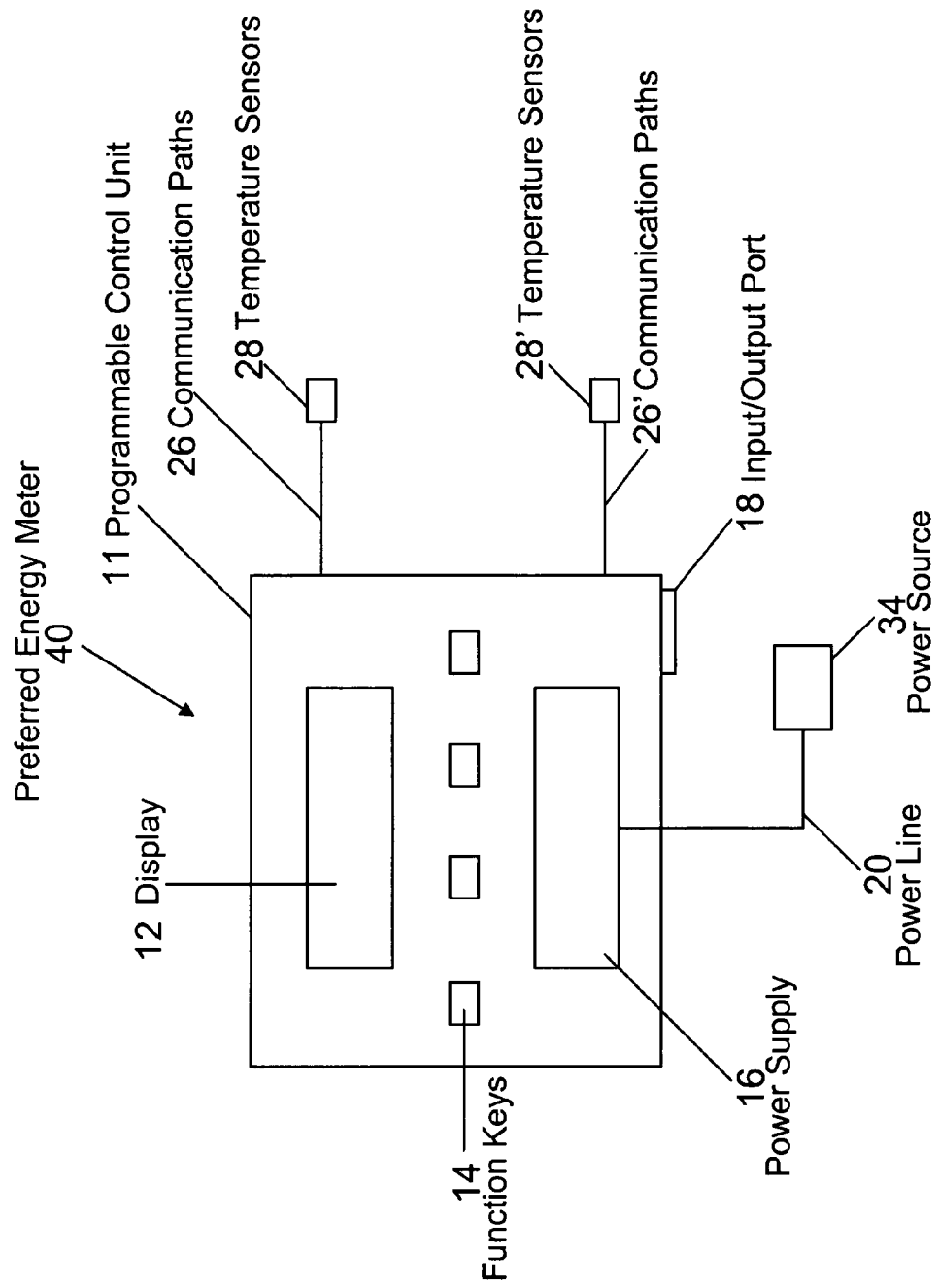
FIG. 2 is a functional block diagram of an embodiment of the invention for when liquid flow is variable.

FIG. 2 illustrates the preferred energy meter 40 of the invention that is used for variable flow systems. This embodiment preferably computes a performance estimate from such solar systems that is analogous to the actual energy production and is a firm indicator that the system is operational along with its relative effectiveness. The unit of measure produced by this system is a unique unit of measure, referred to throughout the specification and claims as "collector performance minutes" (CPM). The CPM is equal to the number of degrees difference between the outlet and inlet of the collector multiplied by the number of minutes the collector operated with that outlet-inlet difference. For example, 2 CPM can be computed from a collector operating at 1 degree outlet-inlet difference for 2 minutes, or at 2 degrees F. outlet-inlet difference for 1 minute, or at ½ degree outlet-inlet difference for 4 minutes, etc. Anytime the outlet temperature is less than or equal to the inlet temperature, the CPM is zero. The CPM is preferably accumulated continuously and recorded in the meter and displayed as required. The CPM is expected to be analogous to the actual energy performance of the system and bears a statistical correlation to the energy performance. However, this relationship is relatively unimportant because the real value of the device is to bear witness to the fact that the solar collector system has been performing its energy production function and to indicate its performance level relative to other similar systems or to its own past performance. The invention thus provides a simple means to indicate performance of solar energy systems that heretofore have been impossible to assess without relatively expensive equipment.

In the meter's Collector Performance Minute mode that is used for variable flow solar systems, the meter's temperature sensors are physically attached to the pipes leading to the inlet and outlets of the solar system. The meter's CPM count is zeroed. Upon initiation by the user, the meter will begin computing CPM from the system based on the temperature difference between the inlet and outlet of the solar system. CPM units are accumulated and are available for display as required by the operator.

Figure 3:
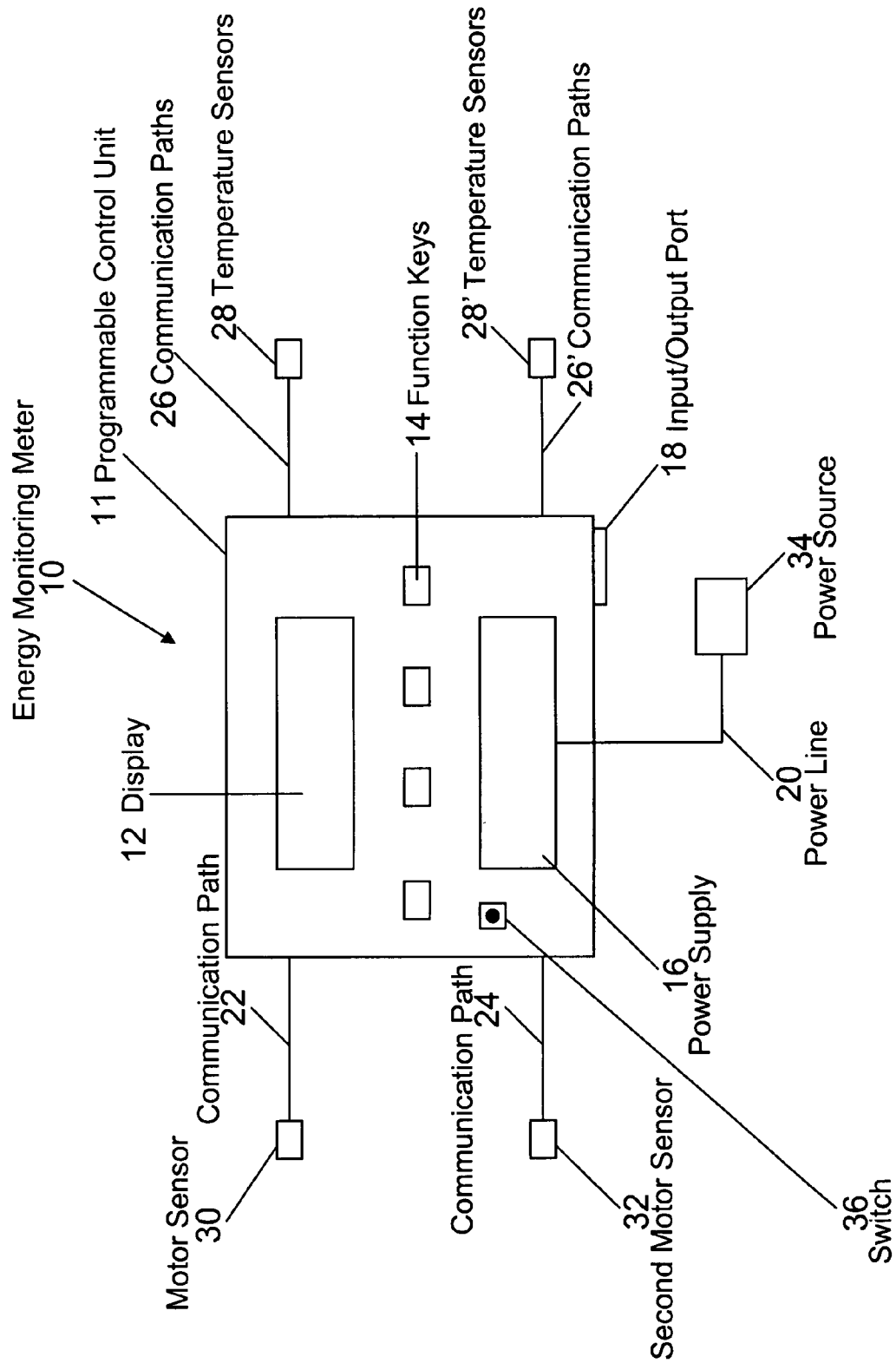
FIG. 3 is a functional block diagram of an embodiment of the invention for when liquid flow is either fixed or variable.

FIG. 3 illustrates a meter capable of functioning either in the mode of the meter of FIG. 1 or the mode of the meter of FIG. 2, as required. Switch 36 is used to place the meter into either of its two functional modes, or this can be accomplished via the function keys. Circuit diagrams of meter according to FIG. 3 are found in U.S. Provisional Patent Application Ser. No. 60/351,437, together with corresponding computer software, but this material is not necessary to ready understanding of the present invention to one of ordinary skill in the art nor represent a best mode of implementing the invention.

A meter according to the invention preferably has the following optional features: (1) The BTU and/or CPM count is retained whether or not the system is powered. (2) The system will operate on standard grid power (120 VAC) and will have a battery module for powering the device in case of grid power failure. (3) The BTU and/or CPM count is available via an RS232, USB, or like data port so that the data can be fetched by a programmable device such as a data logger or computer. (4) The motor operating sensor preferably has two options: (a) an induction sensor that will sense when a pump motor is running based on its electromagnetic field; and (b) a direct physical connection to the motor terminals in which a voltage potential will be sensed. The direct connection has the capability to handle AC voltages ranging from 120 VAC to 480 VAC. The user preferably has the choice of using either sensor to sense pump operation. (5) The display of the units will be in various formats according to the user's choice. Choices include fixed decimal, scientific notation, or computer type exponential notation. (6) Function indicators on the LCD display preferably indicate the mode of operation of the device including BTU collection or CPM estimation, pump on or off, and inlet-outlet difference positive or negative. Optional other data can include date, time, flow rate, temperature difference (outlet-inlet), and CPM count. The date and time indicators are used when data from the meter is being accessed by a computer or data logger. Each time the meter is queried by the computer or logger, a date and time data item is computed and transmitted to the computer or logger along with the BTU or CPM count.

To reiterate, presently many integral collector systems are installed in homes and small commercial buildings for the purpose of preheating domestic water. Presently there is no practical method to indicate whether the solar system is operating and what its relative performance may be. The meter of the invention provides a unique method to easily monitor the performance of variable flow systems such as integral solar collectors. At present, only relatively expensive BTU monitoring systems are available to perform this task. Moreover, to install these units requires that pipes are cut, and sensors installed in the inlet and outlet lines. This is not practical for most small systems. This metering system of the invention offers an easy and economical method for these systems to be monitored. Additionally, while operating in its BTU monitoring mode, and using its induction sensors to indicate pump operation, the meter operates as a fully independent monitor that can be installed without a licensed tradesperson. The meter can be installed without cutting pipes or making electrical connections, thus allowing the system owner, who may have little technical training, to install the system. Moreover, due to its simplicity and ease of use, tradespersons, who are in business as solar installers may find the unit useful as a portable energy monitoring system that can be installed on a system to temporarily monitor its performance for diagnostic purposes. The tradesperson may also use the unit to perform a short-term baseline measurement on a solar system for the purpose of estimating the solar system's economic performance for a customer.

The BTU/CPM system of the invention is much lower in cost than comparable units available. The invention can be produced for an estimated retail cost of around $100 whereas a commercial BTU meter costs upwards of $2000. However, the real advantage of the meter over conventional ones is its ease of installation, which can be accomplished without the need of a qualified tradesperson. This will provide owners of solar systems a means to measure and/or assess relative performance of their solar systems without installing a conventional monitoring system that could cost more than the solar system. As noted above, this new system enhances the ability of all solar system owners to more closely monitor their solar systems. Additionally, the invention is a valuable tool for tradespersons as a diagnostic tool (e.g., plumbers, industrial process control technicians, etc.).

The invention is useful for both commercial and governmental application. Currently, the military has a large number of solar systems that require monitoring, but are too small to justify a conventional monitor. In industry, the applications are vast. Hundreds of thousands of small solar energy systems, both fixed and variable flow, have been installed throughout the world. Many of these systems can benefit from monitoring according to the invention. Electric utilities, such as the Salt River Project in Phoenix, Ariz., are developing new solar water heating technologies for residential applications. There is need to provide their customers with low cost methods to indicate energy performance of their system after it is installed.

Furthermore, the invention is useful for a wide array of monitoring applications other than solar energy systems. Examples include monitoring hot water loops for efficiency, industrial fluid loops for efficiency, and monitoring of air conditioning coolant loops.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A non-invasive energy metering method for liquid flow systems comprising first and second segments of one or more conduits through which a liquid flows, the method comprising the steps of:
    attaching a first temperature sensor for connection to an outside of the first conduit segment;
    attaching a second temperature sensor for connection to an outside of the second conduit segment;
    a user estimating a flow rate of the liquid without use of a flow meter;
    a providing programmable control unit for receiving data from the sensors and the estimated flow rate from the user, said programmable control unit calculating energy data based on the sensor data and the estimated flow rate;
    determining with a motor sensor when to begin the receiving step; and
    communicating data to and from the control unit to an external source through the use of one or more digital input/output ports, namely the energy data is communicated from the control unit and programming data is communicated to the control unit from the external source;
    whereby the method operates without need to temporarily disconnect or alter the first or second conduit segments.

2. The method of claim 1 wherein the motor sensor comprises an induction sensor.

3. The method of claim 1 wherein the programmable control unit calculates energy data in collector performance minutes.

4. The method of claim 1 wherein the temperature sensors comprise digital thermometers.

5. The method of claim 1 additionally comprising the step of employing a power source comprising one or more rechargeable batteries.

6. The method of claim 1 further comprising the step of providing a display device.

7. The method of claim 1 wherein the programmable control unit calculates energy data in British thermal units.

8. The method of claim 1 wherein the first and second conduit segments comprise an inlet to and an outlet of a solar energy system.

9. A non-invasive energy meter for liquid flow systems comprising first and second segments of one or more conduits through which a liquid flows, said meter comprising:
- a first temperature sensor for connection to an outside of the first conduit segment;
- a second temperature sensor for connection to an outside of the second conduit segment;
- a programmable control unit receiving data from said sensors and calculating energy data therefrom without a known amount of heat added to the system;
- a power source for providing power to said meter; and
- one or more input/output ports for communicating data to and from the meter to an external source, namely energy data is communicated from the meter and programming data is communicated to the meter from the external source;
- whereby said meter operates without need to temporarily disconnect or alter the first or second conduit segments, and a flow rate is estimated by a user without use of a flow meter, which flow rate is then input into and used by said programmable control unit for calculating the energy data.

10. The energy meter of claim 9 wherein said temperature sensors comprise digital thermometers.

11. The energy meter of claim 9 wherein said power source comprises one or more rechargeable batteries.

12. The energy meter of claim 9 further comprising a display device.

13. The energy meter of claim 9 wherein said programmable control unit calculates energy data in British thermal units.

14. The energy meter of claim 9 wherein the first and second conduit segments comprise an inlet to and an outlet of a solar energy system.

15. The energy meter of claim 9 additionally comprising a motor sensor, wherein said programmable control unit receives data from said motor sensor.

16. The energy meter of claim 15 wherein said motor sensor comprises an induction sensor.

17. The energy meter of claim 15 wherein said programmable control unit calculates energy data in collector performance minutes.

* * * * *